(12) United States Patent
Wiers

(10) Patent No.: US 6,585,280 B1
(45) Date of Patent: Jul. 1, 2003

(54) ADJUSTABLE HITCH ASSEMBLY FOR TOWING TRAILERS

(76) Inventor: Thomas A. Wiers, 11745 9th Rd., Plymouth, IN (US) 46563

( * ) Notice: Subject to any disclaimer, the term of this patent is extended or adjusted under 35 U.S.C. 154(b) by 0 days.

(21) Appl. No.: 10/050,447

(22) Filed: Jan. 16, 2002

(51) Int. Cl.[7] ................................................. B60D 1/18
(52) U.S. Cl. ................... 280/468; 280/470; 280/479.1; 280/490.1
(58) Field of Search ................................ 280/467–471, 280/477, 478.1, 479.1, 479.2, 490.2

(56) References Cited

U.S. PATENT DOCUMENTS

| | | | |
|---|---|---|---|
| 1,432,066 A | 10/1922 | Housser | 280/468 |
| 2,917,323 A | 12/1959 | Mandekic | 280/468 |
| 3,269,751 A | 8/1966 | Whattoff | 280/482 |
| 3,554,578 A | 1/1971 | Reed | |
| 3,891,239 A | 6/1975 | Leo et al. | 280/468 |
| 4,000,911 A | 1/1977 | Weber | 280/468 |
| 4,057,265 A | 11/1977 | Grace | |
| 4,214,772 A | 7/1980 | Carr et al. | 280/467 |
| 4,564,209 A | 1/1986 | Kingsley et al. | 280/468 |
| 4,946,182 A | * 8/1990 | Weber | 280/402 |
| 5,671,937 A | 9/1997 | Haberle | 280/467 |
| 5,810,542 A | * 9/1998 | Ostrander | 414/462 |
| 6,126,188 A | * 10/2000 | Volodarsky | 280/478.1 |
| 6,155,588 A | 12/2000 | Maxey | 280/488 |

* cited by examiner

*Primary Examiner*—Lesley D. Morris
*Assistant Examiner*—L. Lum
(74) *Attorney, Agent, or Firm*—George Pappas

(57) ABSTRACT

An adjustable hitch assembly is mounted on a towing vehicle and is adapted to move the hitch transversely, horizontally and vertically with respect to the towing vehicle. A first traveler is provided in a horizontally disposed C-shaped channel and is selectively movable along the channel with a rotataly driven threaded rod. A vertical C-shaped channel is mounted to the first traveler. A second traveler is provided in the vertical channel and is selectively movable along the vertical channel with a threaded rod extending longitudinally in the vertical channel. A hitch is mounted to the vertical channel traveler and is adapted for connecting to a trailer.

20 Claims, 6 Drawing Sheets

ADJUSTABLE HITCH ASSEMBLY FOR TOWING TRAILERS

TECHNICAL FIELD

The present invention relates to the technical field of hitch assemblies mounted on a towing vehicle for towing trailers and which are adapted for moving the hitch horizontally, vertically and transversely with respect to the towing vehicle for selectively placing the hitch as needed for connecting to the trailer. More particularly, the present invention is directed to an improved hitch assembly wherein the hitch is selectively more efficiently movable a greater distance with respect to the towing vehicle thereby providing greater versatility when connecting the trailer to the hitch.

BACKGROUND OF THE INVENTION

Trailers are today very commonly used for carrying various products and things. Mobile home trailers, often merely referred to as mobile homes or modular homes, are also today very commonly carried on large trailers. Such trailers are selectively movable with towing vehicles that include a hitch for connecting and towing the trailer. The hitch typically includes a towing ball adapted to be coupled to the trailer towing arm. When connecting or hitching the trailer to the towing vehicle, typically the towing vehicle is required to back up and align the hitch ball with the trailer arm. As can be appreciated, this can be difficult depending on the terrain and other obstacles that may be in the path between the towing vehicle and the trailer arm. It is yet more difficult with larger trailers and especially mobile home and modular home trailers which can be located between landscaping and other obstructions. It is equally difficult to locate large trailers such as mobile home trailers when delivering and placing them at a desired location between other trailers, landscaping, utilities and other obstructions.

To aid the towing operator in more easily hitching and locating trailers, especially large trailers such as mobile home and modular home trailers, adjustable hitches have heretofore been provided whereby the hitch is selectively movable horizontally, transversely, and vertically with respect to the towing vehicle. In this manner, the towing vehicle can be backed up at an angle and position generally close to the trailer arm and, by selectively moving the trailer hitch, the hitch can easily be connected to the trailer arm and/or the trailer arm can be selectively moved as needed for placing the trailer as desired with respect to the towing vehicle.

Although prior hitch assemblies are generally sufficient for the intended purpose, the overall travel distance of the hitch with respect to the towing vehicle is typically limited in view of the hitch assembly structure. Accordingly, a need exists for an improved hitch assembly capable of efficiently selectively moving the hitch a substantial distance with respect to the towing vehicle for yet more easily reaching the trailer arm and connecting thereto and/or placing the trailer as desired.

SUMMARY OF THE INVENTION

It is the principle object of the present invention to overcome the above-discussed disadvantages associated with the prior adjustable hitch assemblies for towing trailers and to provide a hitch assembly which efficiently and effectively provides a significantly larger adjustable travel distance of the hitch with respect to the towing vehicle.

Briefly, the present invention is directed to a new and improved adjustable hitch assembly for towing trailers used for transporting mobile homes, modular homes and other products and things. The hitch assembly is adapted to be mounted to a towing vehicle and provides selective adjustment or travel of the hitch transversely along the length of the vehicle, horizontally and vertically. A mounting frame is provided whereby the hitch assembly is adapted to be mounted to the towing vehicle. The mounting frame includes a sliding frame adapted to travel transversely with respect to the towing vehicle. A C-shaped channel is mounted to the sliding frame and is generally horizontally disposed and perpendicular to the sliding frame. A traveler is provided in the channel and includes low friction wear pads for sliding engagement with the inside surface of the channel for, thereby, allowing the traveler to efficiently move longitudinally in the channel. A threaded rod is coupled to and selectively driven by a reversible motor and extends longitudinally through the C-shaped channel. The rod threadingly engages the traveler and, therefore, by selectively driving the motor and rotating the rod about its longitudinal axis, the traveler is selectively movable longitudinally along the horizontal channel. A second or vertical C-shaped channel is mounted to the horizontally movable traveler. A second or vertically movable traveler is provided in the vertical channel and low friction wear pads are provided thereon for sliding engagement with the inside surface of the vertical C-shaped channel. A second threaded rod extends longitudinally in the vertical channel and is coupled to a reversible motor. The vertical rod threadingly engages the traveler in the vertical channel and, by selectively driving the motor, the second traveler in the vertical channel is selectively movable vertically up and down along the length of the vertical channel.

A hitch is mounted to the vertical channel traveler and includes a ball or other hitch mechanism for connecting to trailers in a known and customary manner. Accordingly, by selectively driving the threaded rods in the horizontal and vertical C-shaped channels and selectively transversely moving the sliding frame, the hitch is selectively movable as desired with respect to the towing vehicle. Additionally, the horizontal and vertical travelers are able to move along the entire length of the respective horizontal and vertical C-shaped channels thereby substantially increasing the overall travel distance of the hitch with respect to the towing vehicle.

In one form thereof, the present invention is directed an adjustable hitch assembly for towing a trailer. The hitch assembly includes a C-shaped channel. A traveler is selectively movable longitudinally in the channel and includes a threaded bore. A threaded rod extends longitudinally in the channel and threadingly engages the traveler threaded bore. A motor is coupled to the threaded rod for selectively rotatably driving the rod about the rod longitudinal axis, whereby the traveler is selectively movable longitudinally in the channel. A hitch is coupled to the traveler and is adapted for connecting to a trailer.

In one form thereof the present invention is directed to an adjustable hitch assembly for towing a trailer. The hitch assembly includes a generally horizontally disposed first C-shaped channel. A first traveler is selectively movable longitudinally in the first channel and includes a threaded bore. A threaded rod extends longitudinally in the first channel and threadingly engages the first traveler threaded bore. A first motor is coupled to the first threaded rod for selectively rotatably driving the first rod about the first rod longitudinal axis, whereby the traveler is selectively movable longitudinally in the horizontally disposed channel. A second C-shaped channel is mounted to the first traveler and is generally vertically disposed. A second traveler is selectively movable longitudinally vertically in the second C-shaped channel and includes a threaded bore. A second threaded rod extends longitudinally in the second channel and threadingly engages the second traveler threaded bore. A second motor is coupled to the second threaded rod for selectively rotatably driving the second rod about the second rod longitudinal axis, whereby the second traveler is selectively movable longitudinally vertically in the second channel. A hitch is coupled to the second traveler and is adapted for connecting to a trailer.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate correspondence parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENTS

Figure 1:
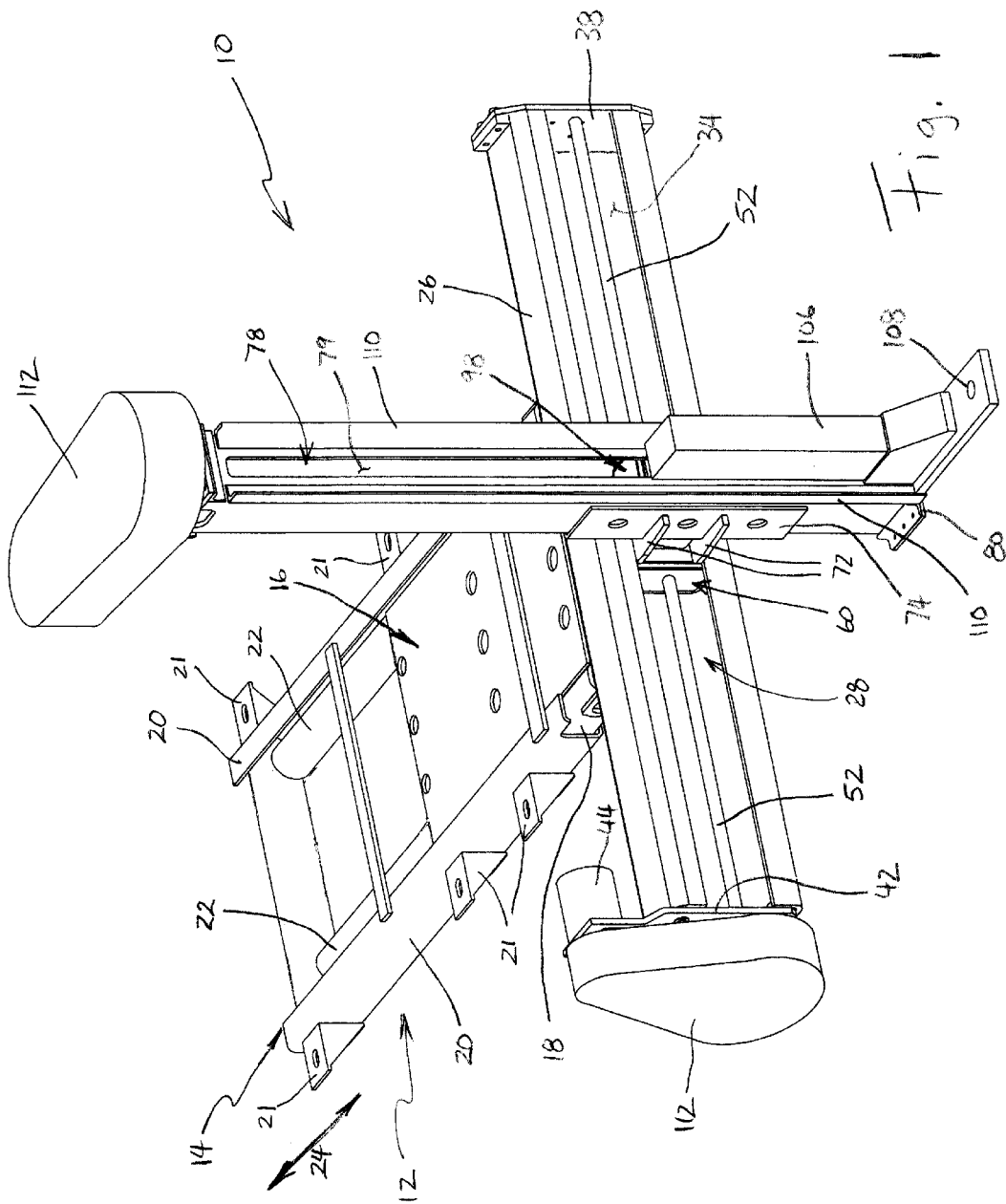
FIG. 1 is a perspective view of an adjustable hitch assembly constructed in accordance with the principles of the present invention.
Figure 2:
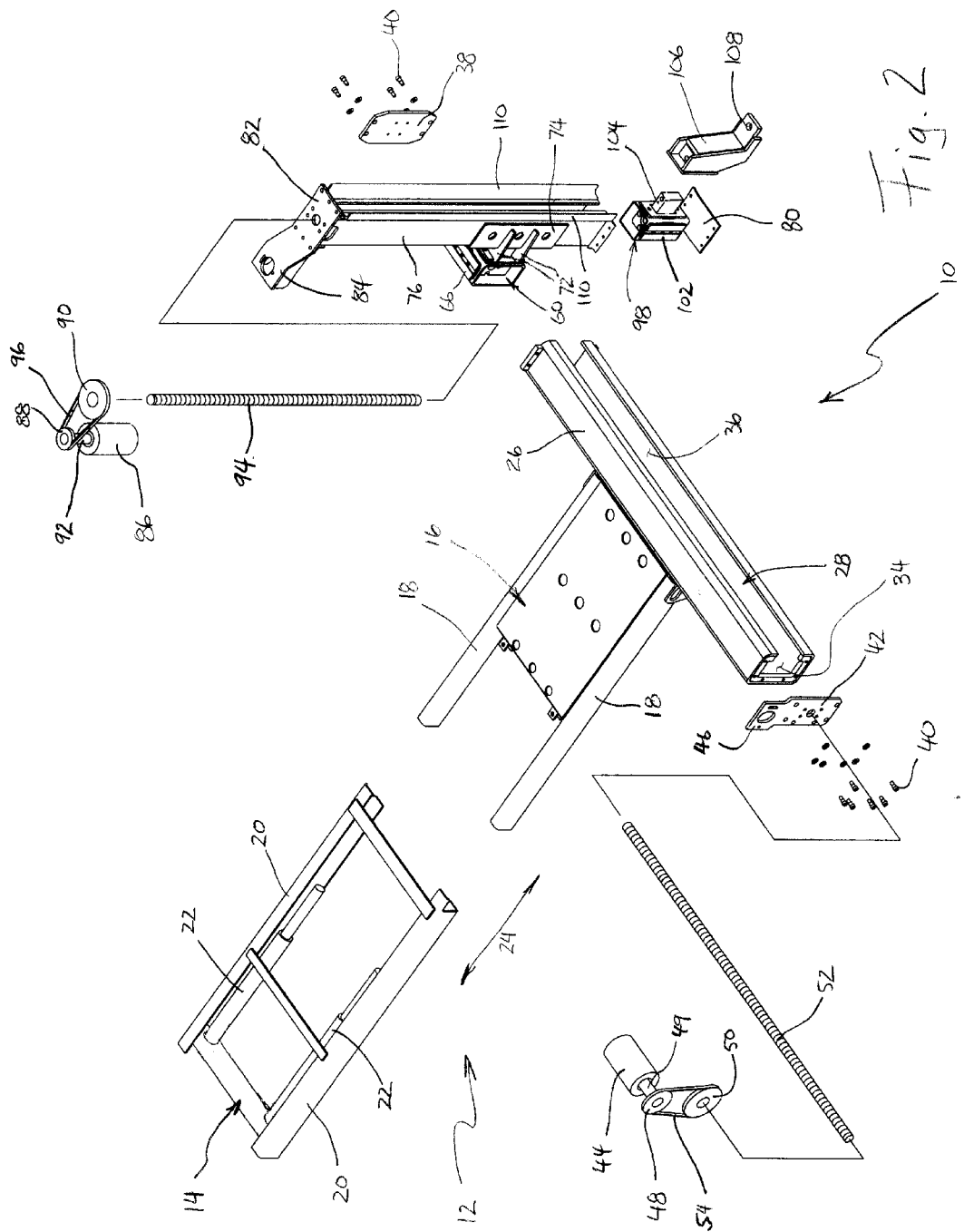
FIG. 2 is an exploded view of the hitch assembly shown in FIG. 1.

Referring initially to FIGS. 1 and 2, there is shown a hitch assembly generally designated by the numeral 10 and constructed in accordance with the principles of the present invention. Hitch assembly 10 includes a mounting frame 12 adapted for mounting the hitch assembly to a towing vehicle such as a truck or tractor (not shown). Mounting frame 12 includes a stationary frame 14 and a sliding or movable frame 16. Sliding frame 16 includes elongate beams 18 slidingly received in the U-shaped channels 20 of stationary frame 14. As best seen in FIG. 1, mounting brackets 21 are affixed to the outside of U-shaped channels 20 for attachment of the mounting frame 12 to the towing vehicle. Hydraulic cylinders 22 are provided and are coupled between the stationary frame 14 and the sliding frame 16 for thereby selectively moving the sliding frame 16 transversely with respect to a towing vehicle as indicated by arrows 24.

A horizontally disposed C-shaped channel 26 is mounted to the sliding frame 16 generally perpendicular thereto as shown. C-shaped channel 26 is preferably made of steel and is integrally formed with a longitudinal opening 28 and inside surfaces including front inside surfaces 30, upper surface 32, back surface 34, and lower surface 36. Cap plate 38 is affixed to one end of C-shaped channel 26 with bolts 40. At the other end of channel 26, a motor plate 42 is similarly attached to and generally closes off the channel 26. A reversible hydraulic motor 44 is mounted to the upper end 46 of plate 42. A sprocket 48 is mounted to the shaft 49 of motor 44. A sprocket 50 is mounted to one end of the threaded rod 52, and a chain 54 is provided and extends between the sprockets 48 and 50. Thus, by selectively driving motor 44, threaded rod 52 is selectively rotatably driven about its longitudinal axis.

Threaded rod 52 is preferably provided with ACME type threads and extends longitudinally through the C-shaped channel 26 as shown. Threaded rod 52 is rotatably supported at its ends with bearings 56 and 58 on respective cap plate 38 and motor plate 42. A traveler 60 is provided inside channel 26 and is adapted to travel longitudinally therein between cap plate 38 and motor plate 42. A nut 62 is affixed to traveler 60 and includes an ACME threaded bore adapted to threadingly engage and receive therethrough threaded rod 52. Accordingly, by selectively rotatably driving threaded rod 52 clockwise and counterclockwise about its longitudinal axis, traveler 60 is longitudinally movable in channel 26 between cap plate 38 and motor plate 42.

Figure 3:
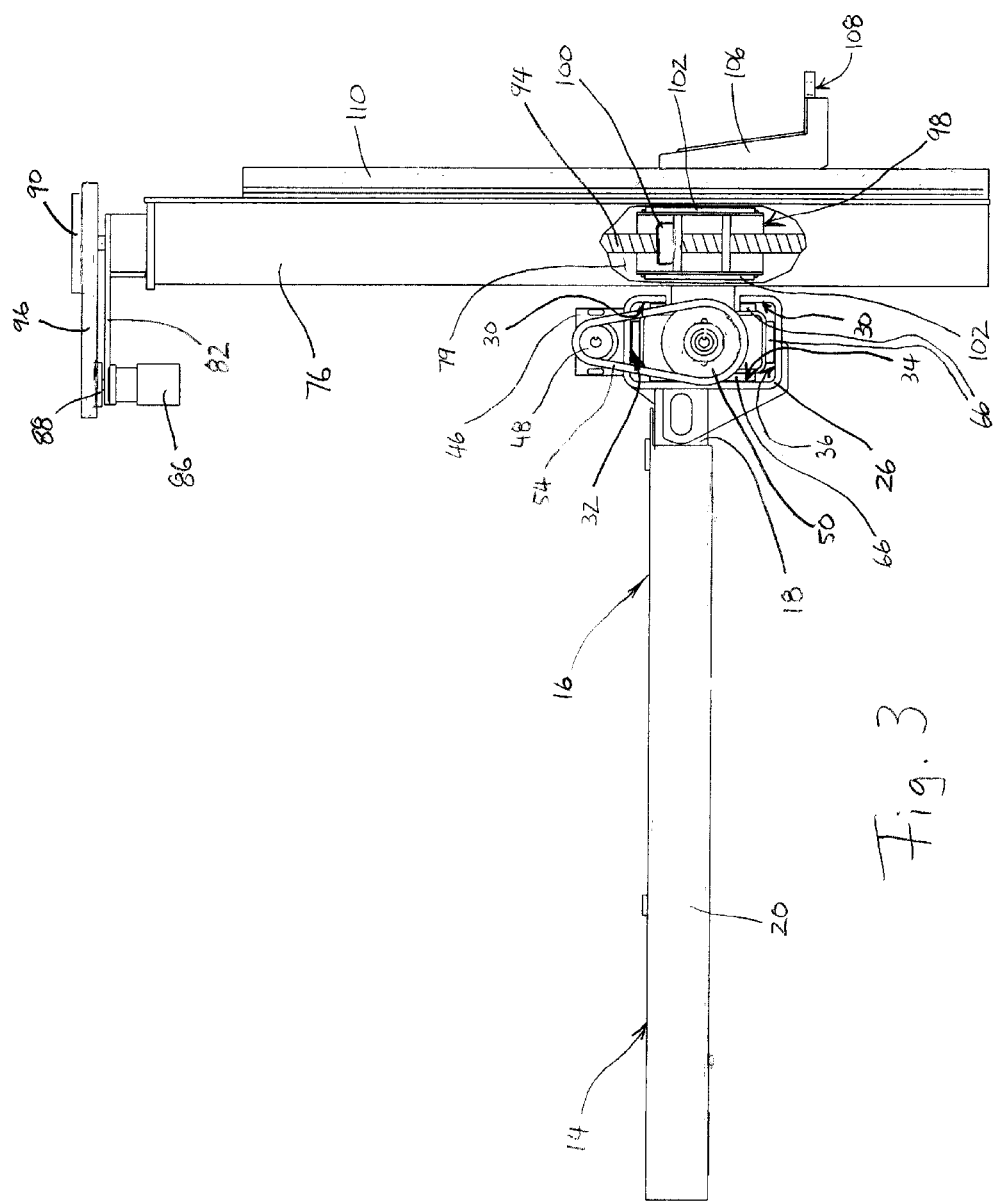
FIG. 3 is a side elevation view of the hitch assembly shown in FIG. 1.
Figure 4:
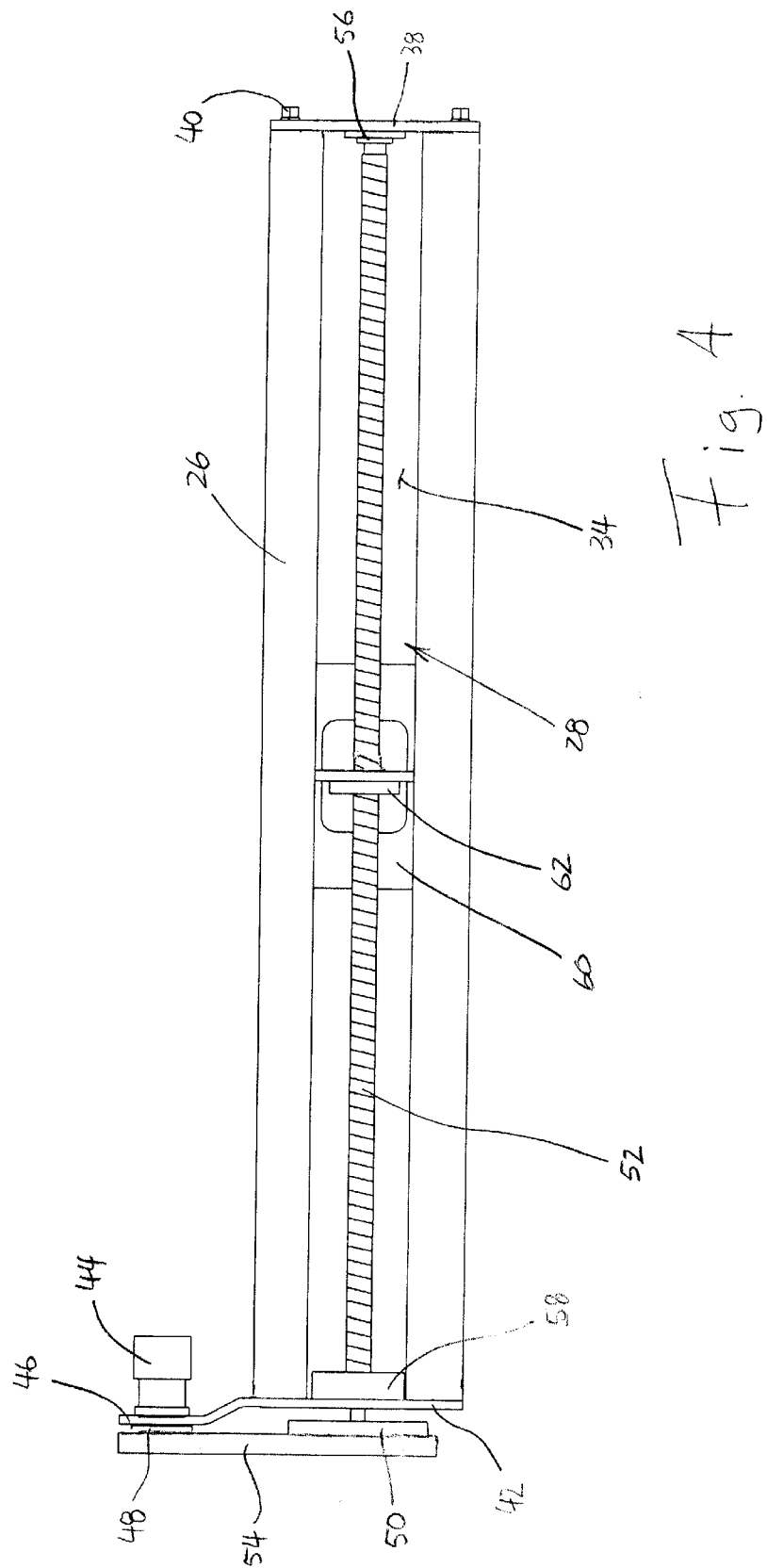
FIG. 4 is a front elevation view of the horizontal C-shaped channel shown in FIG. 1.
Figure 5:
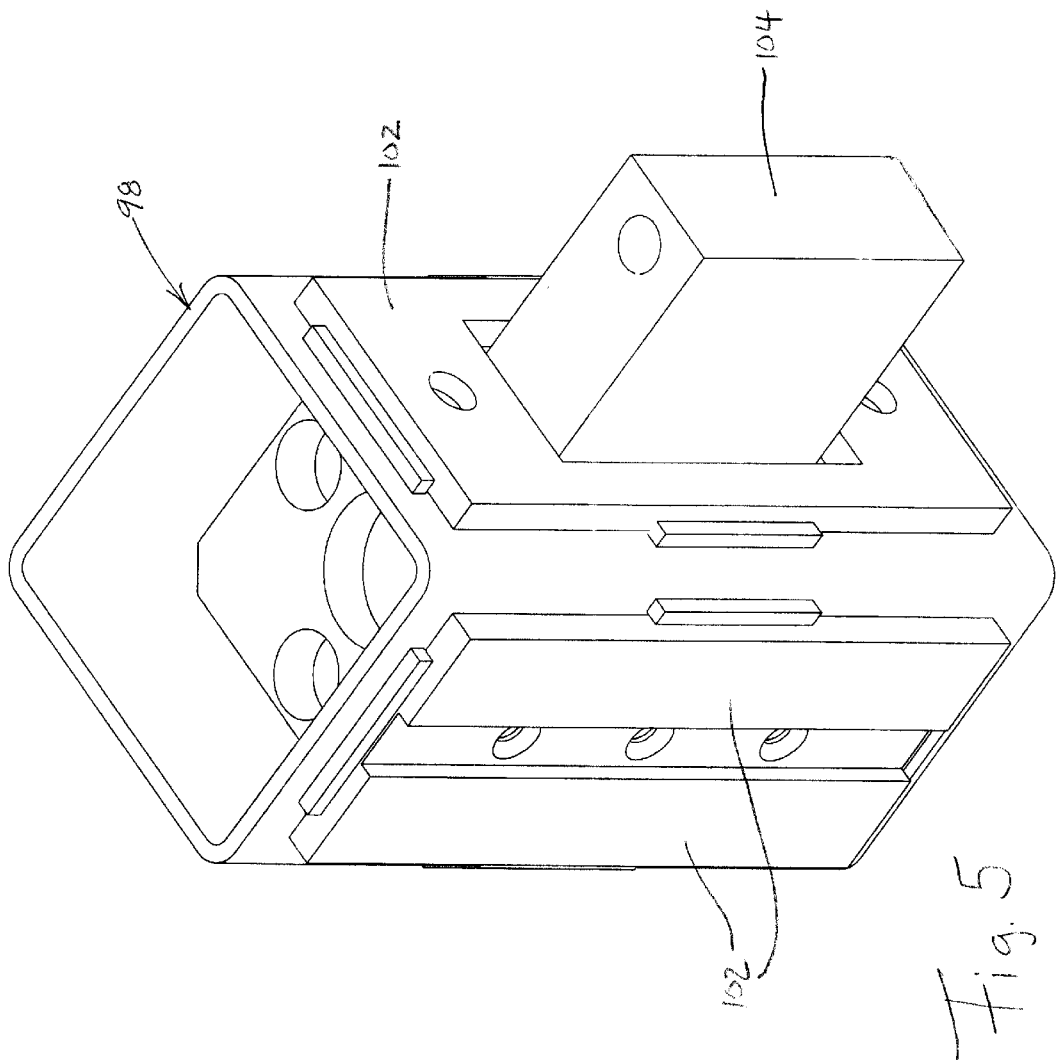
FIG. 5 is a perspective view of the traveler received in the vertical channel shown in FIG. 1; and, FIG. 6 is a perspective view of the traveler received in the horizontal channel shown in FIG. 1.
Figure 6:
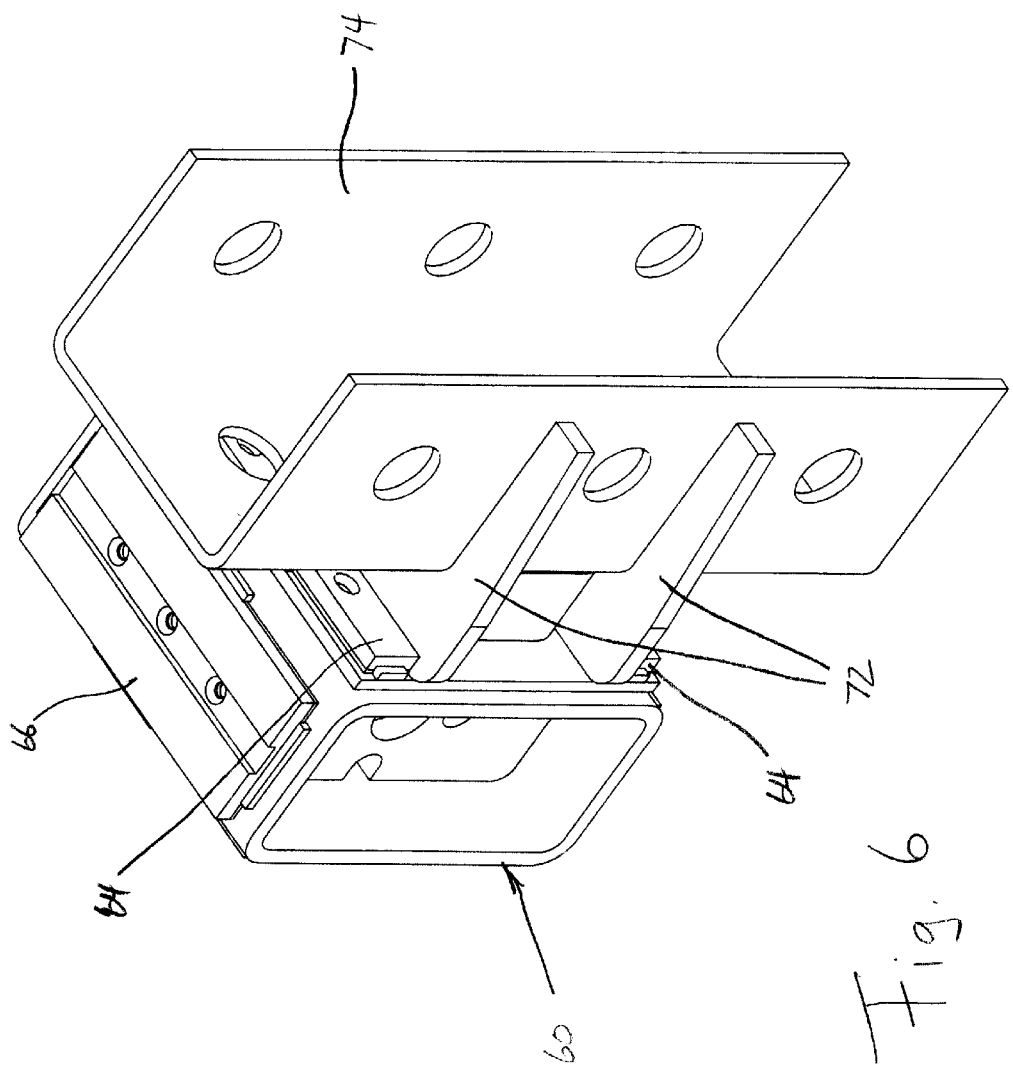

As best seen in FIGS. 3 and 6, traveler 60 is provided with wear pads preferably made of high density polyethylene for engaging the inside surfaces of C-channel 26 and providing efficient sliding motion of the traveler 60 within the C-shaped channel 26. More particularly, front wear pads 64 are affixed to traveler 60 for sliding engagement with the channel front inside surfaces 30, upper wear pads 66 are affixed to the traveler 60 for engagement with the upper surface 32, back wear pads 68 are affixed to traveler 60 for engagement with the back surface 34 and the lower wear pads 70 are affixed to traveler 60 for engagement with the lower surface 36. Wear pads 64, 66, 68 and 70 are affixed to the traveler 60 by bolts or other suitable means.

Forks 72 are affixed to the traveler 60 and extend therefrom as best seen in FIG. 1 out through the C-shaped channel longitudinal opening 28. U-shaped support member 74 is affixed to and carried by forks 72. Vertical C-shaped channel 76 is in turn mounted in and carried by the support member 74. Accordingly, the vertical C-shaped channel 76 is selectively movable horizontally along with traveler 60.

Vertical C-shaped channel 76. similar to the horizontal C-shaped channel 26, includes a longitudinal opening 78 and inside wall surfaces 79. A bottom plate 80 is affixed to the lower end of vertical channel 76 with bolts (not shown). A motor plate 82 is affixed to and closes off the upper end of vertical channel 76. Similar to motor plate 42, plate 82 includes an end 84 whereat reversible hydraulic motor 86 is mounted. A sprocket 88 is attached to the shaft 92 of motor 86 and is thereby selectively rotatably driven. A sprocket 90 is attached to one end of the threaded rod 94. A chain 96 extends between sprockets 88 and 90 for thereby selectively rotatably driving threaded rod 94 about its longitudinal axis.

Threaded rod 94 similar to rod 52 is provided with ACME threads and extends longitudinally within the vertical C-shaped channel 76. Threaded rod 94 is rotatably supported at its ends with bearings (not shown) on the bottom plate 80 and motor plate 82. A vertical traveler 98 is provided within the C-shaped channel 76 and is adapted to travel longitudinally vertically within the channel 76 between the bottom plate 80 and motor plate 82. A nut 100 having an acme threaded bore is affixed to the traveler 98 and the threaded rod 94 extends through and threadingly engages the threaded nut 100. Accordingly, by selectively rotatably driving threaded rod 94 clockwise and counter clockwise about its longitudinal axis, traveler 98 is selectively movable vertically up and down in channel 76 between the bottom plate 80 and the motor plate 82. Similar to the horizontal traveler 60, wear pads 102 preferably made of high density polyethylene are provided and affixed to the outside of traveler 98 for engaging the inside surfaces 79 of vertical C-shaped channel 76 and thereby providing efficient sliding motion of the traveler 98 longitudinally within the C-shaped channel 76.

Vertical traveler 98 is provided with an extension 104 extending through the longitudinal opening 78 and whereupon a hitch tongue 106 is mounted. Hitch tongue 106 includes a hole 108 whereat a hitch ball (not shown) or other type of hitching component may be affixed for connecting to a trailer arm in a known and customary manner. Guide rails 110 are attached to the vertical C-shaped channel 76 generally parallel with and on the sides of the channel longitudinal opening 78 for guiding the hitch tongue 106. As should now be appreciated, the hitch tongue 106 can be selectively moved as desired by extending and retracting cylinders 22 and selectively driving the reversible hydraulic motors 44 and 86. Additionally, the horizontal and vertical motion is limited only by the length of the C-shaped channels 26 and 76 and can be made any length as desired for accommodating any size towing vehicle.

It is noted that all of the various components and parts with the exception of the wear pads are preferably fabricated from steel and are attached to one another by welding and other fasteners as needed or desired. Additionally, drive train covers 112 can be provided as shown in FIG. 1 for covering the sprockets and chains. Further, if desired, pulleys and belts could be used instead of the chains and sprockets for rotatably coupling the motors and threaded rods.

While the invention has been described as having specific embodiments, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. An adjustable hitch assembly for towing a trailer, said hitch assembly comprising:
   a C-shaped channel;
   a traveler selectively moveable in said channel and including a threaded bore;
   a threaded rod extending in said channel and threadingly engaging said traveler threaded bore;
   a motor coupled to said threaded rod for selectively rotatably driving said rod about a rod axis, whereby said traveler is selectively movable in said channel; and,
   a hitch coupled to said traveler, said hitch adapted for connecting to a trailer.

2. The hitch assembly of claim 1 wherein said C-shaped channel is generally horizontally disposed whereby said traveler and said hitch are generally horizontally movable.

3. The hitch assembly of claim 1 wherein said C-shaped channel includes an inside surface and said traveler includes a wear pad disposed between said traveler and said channel inside surface.

4. The hitch assembly of claim 3 wherein said wear pad is made of high density polyethylene.

5. The hitch assembly of claim 1 further comprising a mounting frame adapted to mount said C-shaped channel to a towing vehicle.

6. The hitch assembly of claim 5 wherein said mounting frame includes. means for selectively moving said C-shaped channel with respect to the towing vehicle.

7. The hitch assembly of claim 1 wherein said motor is a selectively reversible hydraulic motor.

8. The hitch assembly of claim 7 wherein said motor is coupled to said threaded rod with a sprocket coupled to said motor, a sprocket coupled to said threaded rod, and a chain extending between said sprockets.

9. The hitch assembly of claim 1 wherein said motor is coupled to said threaded rod with a sprocket coupled to said motor, a sprocket coupled to said threaded rod, and a chain extending between said sprockets.

10. The hitch assembly of claim 1 wherein said C-shaped channel includes upper and lower inside surfaces and said traveler includes wear pads disposed between said traveler and said channel upper and lower inside surface; wherein said C-shaped channel is generally horizontally disposed whereby said traveler and hitch are generally horizontally moveable; wherein said motor is a selectively reversible hydraulic motor and is coupled to said threaded rod with a sprocket coupled to said motor, a sprocket coupled to said threaded rod, and a chain extending between said sprockets; and, further comprising a mounting frame adapted to mount said C-shaped channel to a towing vehicle and wherein said mounting frame includes means for selectively moving said C-shaped channel with respect to the towing vehicle.

11. The hitch assembly of claim 10 wherein said C-shaped channel is integrally formed.

12. The hitch assembly of claim 1 wherein said C-shaped channel is integrally formed.

13. An adjustable hitch assembly for towing a trailer, said hitch assembly comprising:
   a generally horizontally disposed first C-shaped channel;
   a first traveler selectively moveable in said first channel and including a threaded bore;
   a first threaded rod extending in said first channel and threadingly engaging said first traveler threaded bore;
   a first motor coupled to said first threaded rod for selectively rotatably driving said first rod about a first rod axis, whereby said traveler is selectively movable in said channel;
   a second generally vertically disposed C-shaped channel mounted to said first traveler;
   a second traveler selectively movable in said second C-shaped channel and including a threaded bore;
   a second threaded rod extending in said second channel and threadingly engaging said second traveler threaded bore;
   a second motor coupled to said second threaded rod for selectively rotatably driving said second rod about a second rod axis, whereby said second traveler is selectively movable in said second channel; and,
   a hitch coupled to said second traveler, said hitch adapted for connecting to a trailer.

14. The hitch assembly of claim 13 wherein said first and second C-shaped channels include inside surfaces and said respective first and second travelers include wear pads disposed between said first and second travelers and said respective first and second channels inside surfaces.

15. The hitch assembly of claim 14 wherein said wear pads are made of high density polyethylene.

16. The hitch assembly of claim 13 further comprising a mounting frame adapted to mount said first C-shaped channel to a towing vehicle.

17. The hitch assembly of claim 16 wherein said mounting frame includes means for selectively moving said first C-shaped channel with respect to the towing vehicle.

18. The hitch assembly of claim 13 wherein said first and second motors are selectively reversible hydraulic motors.

19. The hitch assembly of claim 18 wherein said first and second motors are coupled to said respective first and second threaded rods with a sprocket coupled to each of said first and second motors, a sprocket coupled to each of said first and second threaded rods, and a chain extending between each of said respective first and second motor sprockets and said rod sprockets.

20. The hitch assembly of claim 13 wherein said first and second C-shaped channels are integrally formed.

\* \* \* \* \*